United States Patent
Yoshikawa et al.

[11] Patent Number: 5,157,532
[45] Date of Patent: Oct. 20, 1992

[54] POST-OBJECTIVE TYPE OPTICAL SCANNER

[75] Inventors: Motonobu Yoshikawa, Nishinomiya; Yoshiharu Yamamoto, Toyonaka, both of Japan

[73] Assignee: Matsushita Electric Industrial Co., Ltd., Osaka, Japan

[21] Appl. No.: 785,106

[22] Filed: Oct. 30, 1991

[30] Foreign Application Priority Data

Nov. 1, 1990 [JP] Japan .................. 2-297971

[51] Int. Cl.⁵ .............................................. G02B 26/10
[52] U.S. Cl. .................................. 359/196; 359/216; 359/219; 250/236; 346/108
[58] Field of Search ............... 359/216, 217, 218, 219, 359/213, 214, 215, 196, 868, 869; 250/235, 236; 346/108, 160

[56] References Cited

U.S. PATENT DOCUMENTS

| | | | |
|---|---|---|---|
| 4,357,071 | 11/1982 | Mankel et al. | 359/218 |
| 4,560,862 | 12/1985 | Eastman et al. | 359/219 |
| 4,624,528 | 11/1986 | Brueggemann | 359/216 |
| 4,756,585 | 7/1988 | Kaneko et al. | 359/218 |
| 4,875,748 | 10/1989 | Matsumoto et al. | 359/218 |
| 5,039,184 | 8/1991 | Murakawa et al. | 359/216 |

FOREIGN PATENT DOCUMENTS 61-156020 7/1986 Japan .

*Primary Examiner*—Loha Ben
*Attorney, Agent, or Firm*—Wenderoth, Lind & Ponack

[57] ABSTRACT

A post-objective type optical scanner in which optical flux is converted to condensed light or diffused light by a lens and then scanned on a scanning surface by an optical deflector is constituted by a light source, an optical scanner for leading the flux of light from the light source to an optical deflector and an optical deflector which has a toric deflecting surface in which the radius in the scanning direction is convex and the radius in the sub-scanning direction is concave, and which compensates the curvatures of field in both scanning and sub-scanning directions and scans the optical flux by rotation.

3 Claims, 5 Drawing Sheets

POST-OBJECTIVE TYPE OPTICAL SCANNER

BACKGROUND OF THE INVENTION:

1. Field of the Invention

The present invention relates to an optical scanner to be used for a laser printer and the like, more particularly to a post-objective type optical scanner in which optical flux is converted to condensed light by a condensing lens and scanned by an optical deflector, and an image forming apparatus using the same.

2. Description of the Prior Art

An optical scanner which is frequently used for the conventional laser printer and the like is a pre-objective type. The pre-objective type optical scanner has a condensing lens arrangement after the optical deflection, and it is easy to compensate the curvature of field and $f\theta$ characteristic by the condensing lens. However, due to the necessity to use large size condensing lens and sophisticated constitution, the optical scanner is expensive and also, due to the necessity to reserve a long optical path, it has difficulty of being formed into small size. Recently, a post-objective type optical scanner in which a condensing lens is disposed before the optical deflection has come to be studied and commercialized as one which can realize a small sized, low priced optical scanner.

As an example of the conventional post-objective type optical scanner, there is one as disclosed in Japanese Patent Laid-open Publication No. 2-169422/1989. In this prior art, the curvature of field in the scanning direction is compensated by making the reflecting surface of the optical deflector cylindrical or spherical, and the curvature of field in the sub-scanning direction is compensated by varying the power of the compensating lens disposed between the optical deflector and the scanning surface from the center to the periphery in the scanning direction. However, the system has a problem of difficulty to make the size small because of the arrangement of a lens between the optical deflector and the scanning surface.

SUMMARY OF THE INVENTION

An object of the present invention is to provide a low-priced and small sized objective type optical scanner which shows high resolution and an image forming apparatus using the same.

In order to attain the above object, a post-objective type optical scanner of the present invention uses an optical deflector of aspherical configuration in which a deflecting surface has a convex radius in a scanning direction and a concave radius in a sub-scanning direction.

As described above, by making the deflecting surface of the optical deflector aspherical with a convex radius in the scanning direction and a concave radius in the sub-scanning direction, the curvature of field in the scanning direction and the curvature of field in the sub-scanning direction are to be compensated simultaneously by a deflecting surface.

Further, when the curvatures of field in both scanning and sub-scanning directions are compensated by making the deflecting surface of said optical deflector a toric surface having a convex radius in the scanning direction and a concave radius in the sub-scanning direction, which is made by rotating an arc having its center at a point on a normal line at the vertex and existing on a plane which is perpendicular to the rotational axis of the optical deflector and contains the normal line, about an axis which excists on the plane containing the arc and is perpendicular to the normal line. With this structure, an optical deflector which is easy to work and low in price can be produced.

Further, by using the optical scanner of the present invention, an image forming apparatus which is small in size, low in price and has high resolution can be realized.

DESCRIPTION OF THE PREFERRED EMBODIMENTS

Hereinafter, the post-objective type optical scanner according to an embodiment of the present invention is explained with reference to the drawings.

Figure 1:
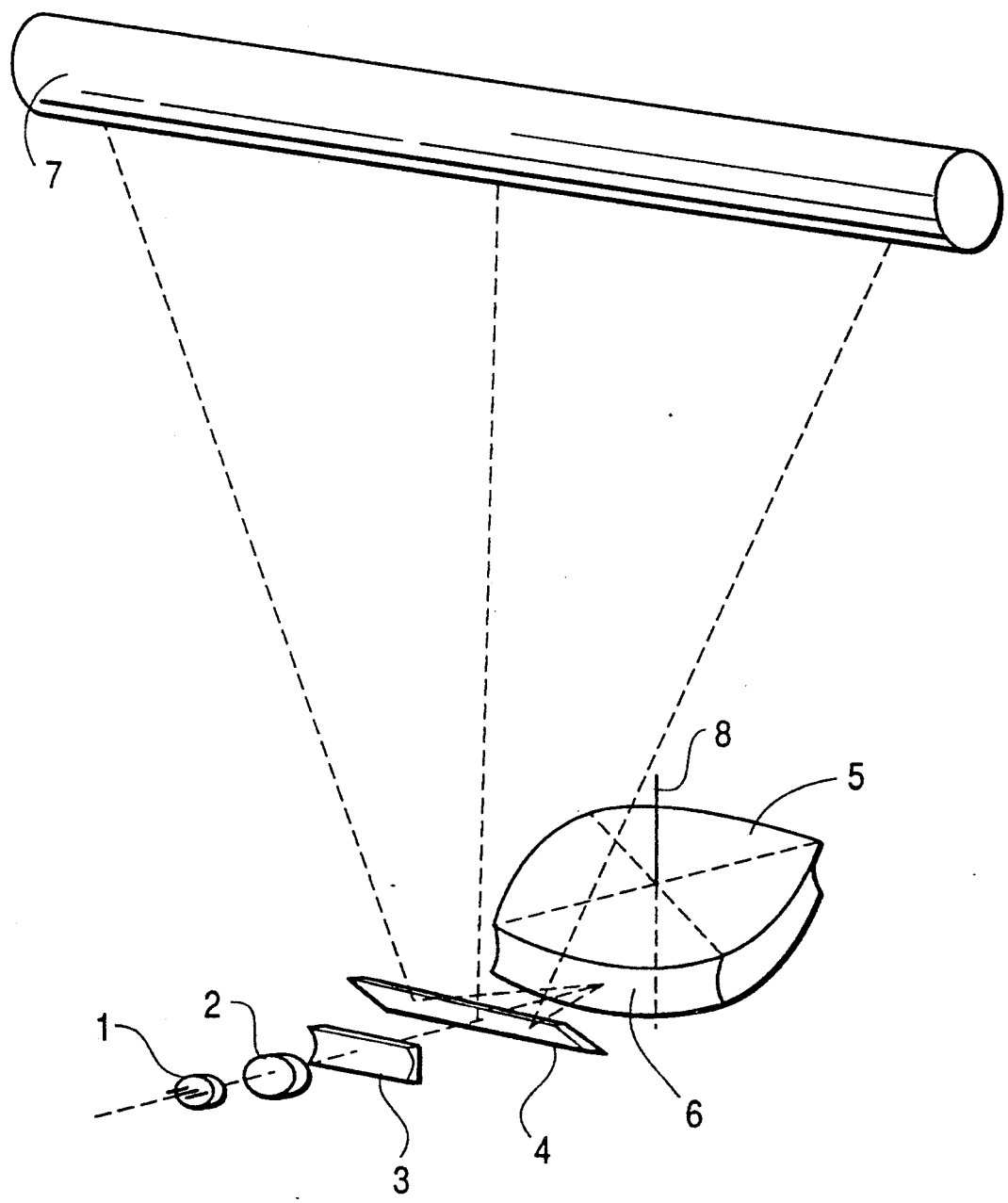
FIG. 1 is a structural view showing an embodiment of the present invention.

FIG. 1 shows a construction of the post-objective type optical scanner according to an embodiment of the present invention.

In FIG. 1, the numerals denote, respectively: 1 is a semiconductor laser, 2 is a condensing lens for condensing the luminous flux from the semiconductor laser 1, 3 is a cylindrical lens having power in the sub-scanning direction, 4 is a half mirror, 5 is a polygon having a toric deflecting surface which deflects by rotating the flux, 6 is a deflecting surface, 7 is a photosensitive drum disposed on the scanning surface, and 8 is a center axis for rotation of polygon.

Figure 3A:
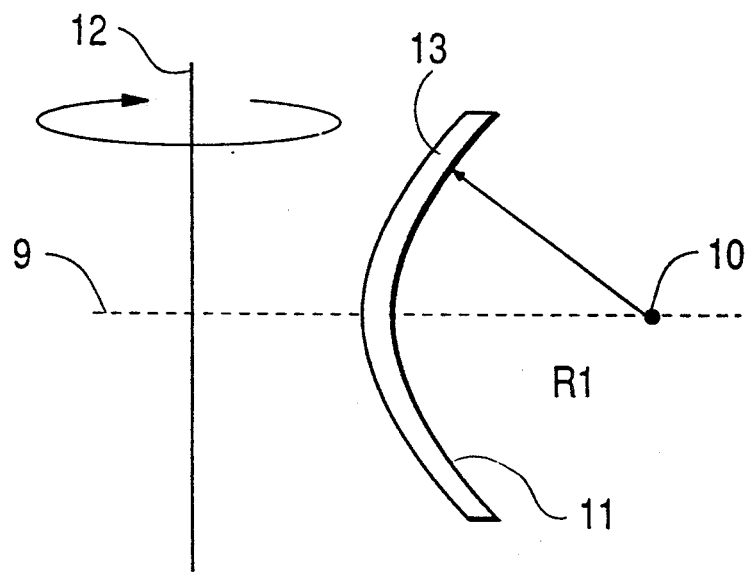
FIGS. 3 (a) and 3 (b) are structural views showing the configurations of the deflecting surface to be used in the present invbention.
Figure 3B:
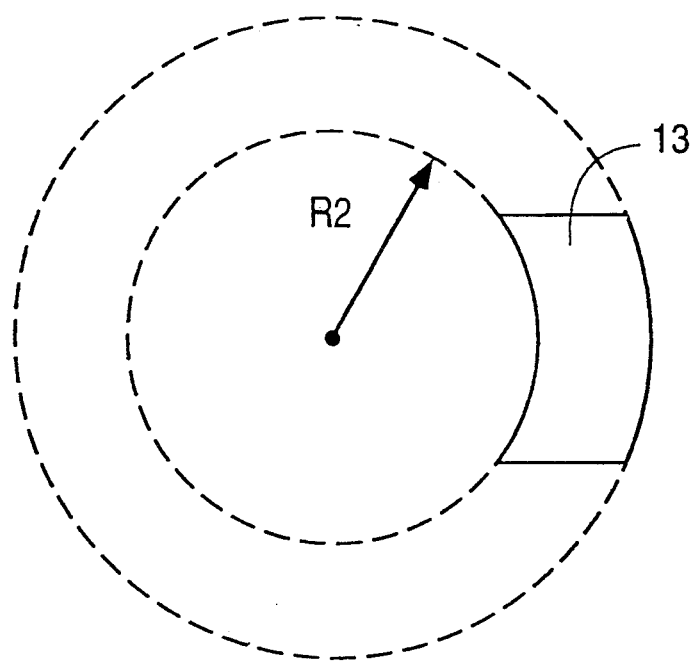

FIG. 3 (a) shows an upper surface view showing the shape of the deflecting surface 6 in the horizontal direction, and FIG. 3 (b) a side view showing the shape of the deflecting surface 6 in the vertical direction.

In FIG. 3 (a), the part 9 shows a center axis which is a normal line at the vertex of the deflecting surface 6, 10 is a point on the center axis 9, 11 is an arc of a radius R1 existing on a plane and having its center at the point 10. This plane is perpendicular to the center axis 8 of rotation of the optical deflector and includes the center axis 9. An axis 12 is an axis of rotation symmetry which is perpendicular to the center axis 9 existing on the plane including the arc. A toric surface 13 is made by rotating the arc 11 about the axis 12. The toric surface is the shape of the deflecting surface 6.

In FIG. 3 (b), R2 is a distance to the symmetrical axis of rotation 12 of the arc 11 on the center axis 9.

Concrete numerical values are shown in Table 1 and Table 2, where $Y_o$ is an effective scanning width, L is a distance from the deflecting surface 6 to the photosensitive drum 7, r is a distance from the center axis 8 of rotation of polygon to the vertex of the deflecting surface 6, and R1 and R2 are those shown in FIGS. 3 (a) and 3 (b), respectively.

TABLE 1

| Y₀ | L | R1 | R2 | r |
|---|---|---|---|---|
| 216 | 230 | 188.7 | 145.3 | 22.6 |

TABLE 2

| Y₀ | L | R1 | R2 | r |
|---|---|---|---|---|
| 216 | 230 | 165.5 | 138.9 | 14.9 |

Figure 4A:
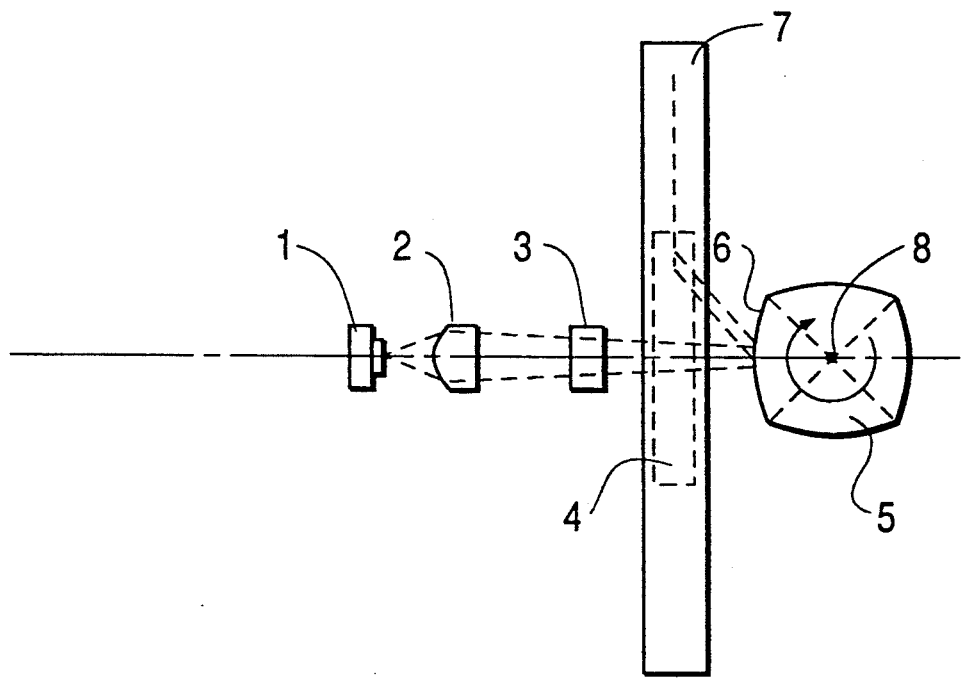
FIGS. 4 (a) and 4 (b) are views to show the scanning, sub-scanning and optical channel in each direction.
Figure 4B:
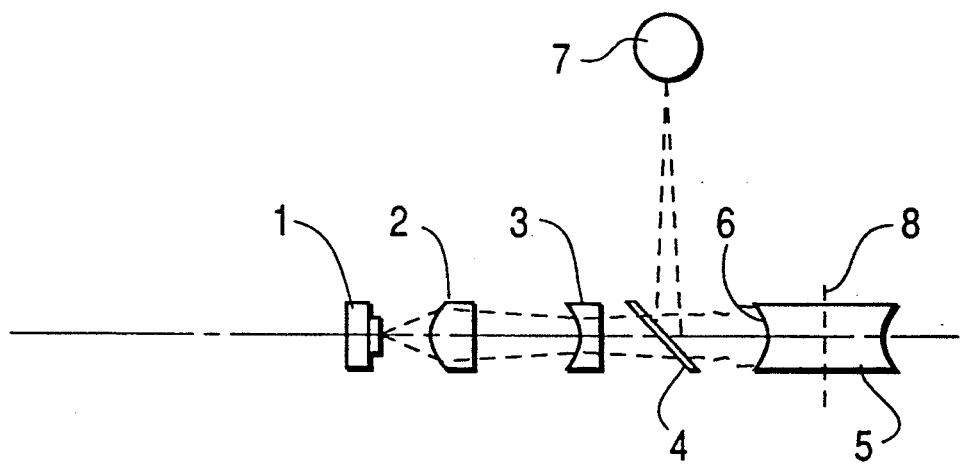
Figure 5:
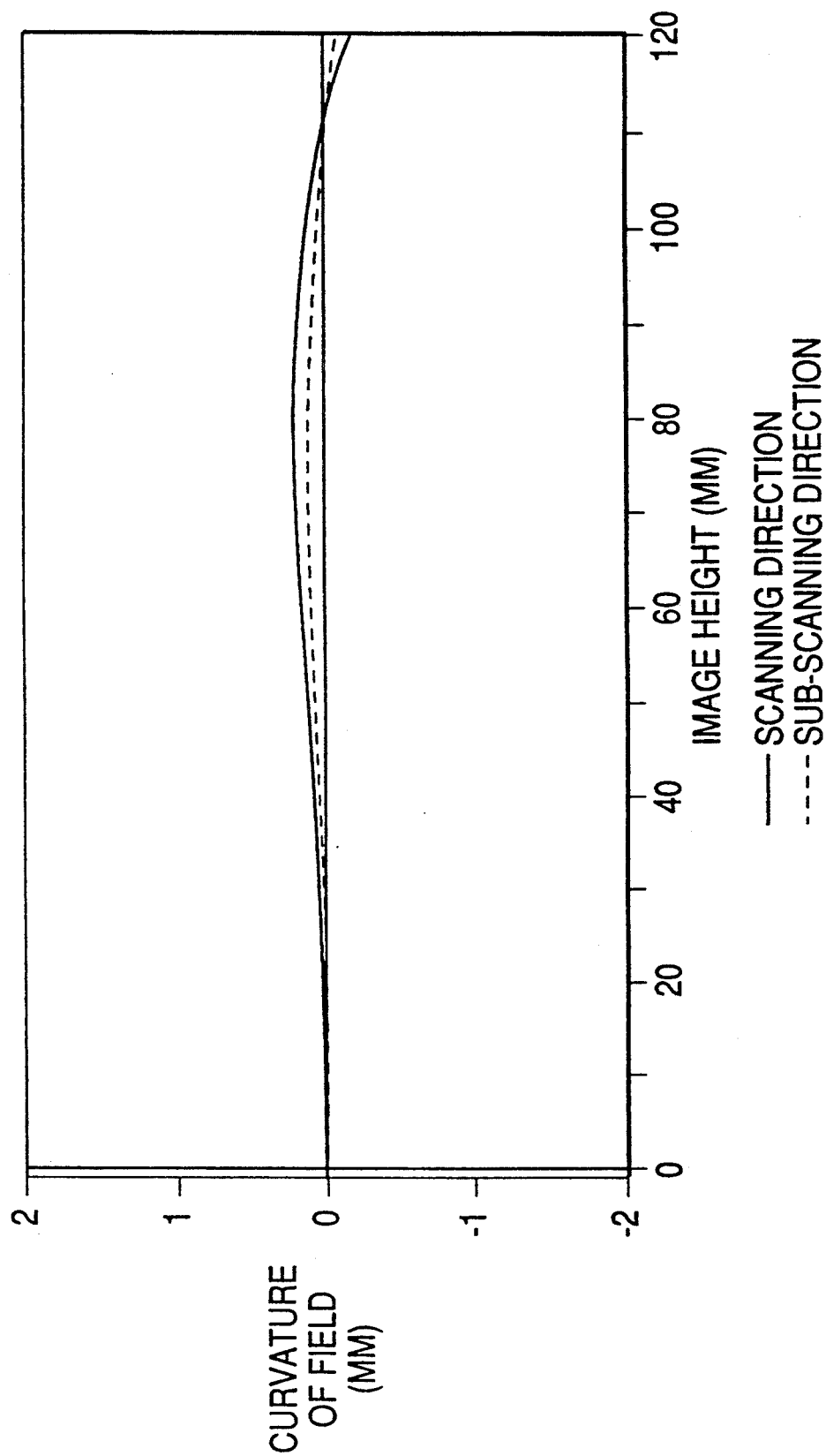
FIG. 5 is an illustrative view showing the optical performance of the present invention.

With respect to the post-objective type optical scanner constituted as above, the operation thereof is explained by way of FIGS. 4 (a) and 4 (b) hereafter.

First, FIG. 4 (a) shows an optical channel diagram in the scanning direction surface, and FIG. 4 (b) an optical channel diagram in the sub-scanning direction surface. The optical flux from the semiconductor laser 1 becomes condensed light by a condensing lens 2, which is incident on the cylindrical lens 3 to become slightly scattering light in respect to the sub-scanning direction only, and passes through the half-mirror to the deflecting surface 6. The light reflected on the deflecting surface 6 is reflected on the half mirror 4 to reach the photosensitive drum 7. The polygonal mirror 5 composed of toric surface rotates at the center of the rotary center axis 8 to deflect the incident laser beam and scan on the photosensitive drum 7, and by making the configuration of the deflecting surface 6 toric, the curvatures of field in the scanning direction and sub-scanning direction are compensated to form images on all scanning region without focusing displacement. The curvature of field in this embodiment is shown in FIG. 8. The $f\theta$ characteristic is compensated by electrically varying the clock of the signal output depending on the scanning position.

As described above, according to this embodiment, the curvatures of field in the scanning direction and sub-scanning direction can be compensated by using a polygonal mirror 5 composed of toric surface as an optical deflector, by which there is realized an optical scanner which includes no optical system between the optical deflector and the scanning surface.

Figure 2:
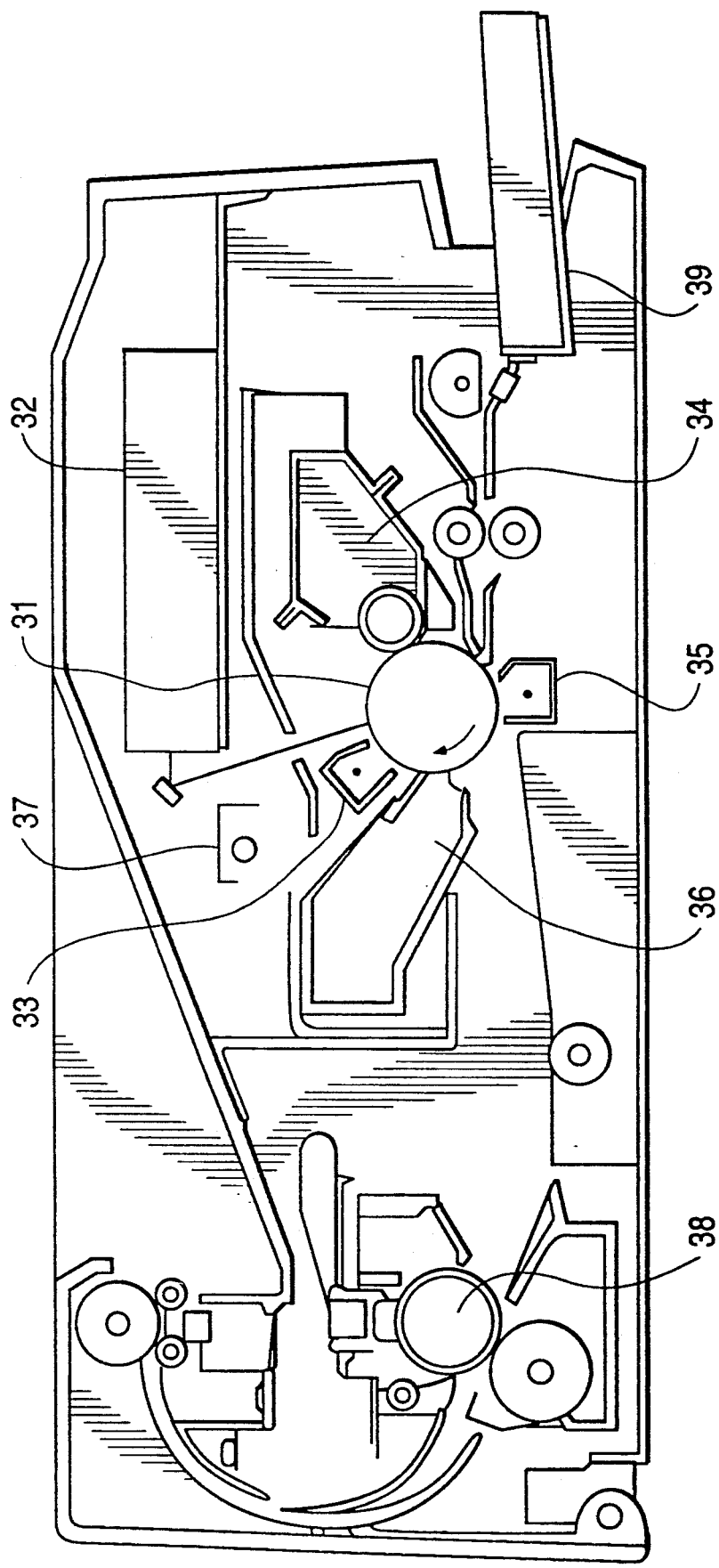
FIG. 2 is a structural view showing an image forming apparatus using the optical scanner in the embodiment.

FIG. 2 shows a construction in the case where the optical scanner of the above embodiment is used for the image forming apparatus.

In FIG. 2, the part 31 is a photosensitive drum covered on its surface with a photosensitive body whose charge varies under irradiation of light, 32 is a corona charging unit which is charged by attracting static ion on the surface of a photosensitive body, 33 is an optical scanner for writing the printing information on the photosensitive body of the above embodiment, 34 is a developer unit for depositing the charged toner on the printing section, 35 is a corona transfer unit for transferring the attached toner onto the paper, 36 is a cleaner for removing the remaining toner, 37 is a print fixing unit for fixing the transferred toner to the paper, and 38 is a paper feeding casette.

As described above, by using the optical scanner of the above embodiment, a small sized and low priced image forming apparatus having high resolution can be realized.

What is claimed is:

1. A post-objective type optical scanner in which optical flux is converted to condensed light or diffused light by a lens and then scanned on a scanning surface by an optical deflector, characterized in that a deflecting surface of the optical deflector has aspherical configuration such that the radius of curvature of the deflecting surface in a scanning direction is convex and the radius of curvature of the deflecting surface in a sub-scanning direction is concave.

2. The post-objective type optical scanner as described in claim 1, in which the deflecting surface of the optical deflector has a toric surface made by rotating an arc having its center at a point on a normal line at the vertex of the surface and existing on a plane which is perpendicular to a rotational axis of the optical deflector and contains the normal line about an axis which exists on said plane and is perpendicular to said normal line.

3. An image forming apparatus using the post-objective type optical scanner claimed in claim 1.

* * * * *